(12) United States Patent
Kitazaki (10) Patent No.: US 7,974,449 B2
(45) Date of Patent: Jul. 5, 2011

(54) SYSTEM AND METHOD FOR RECORDING HANDWRITTEN NOTES

(75) Inventor: Masako Kitazaki, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 904 days.

(21) Appl. No.: 11/351,258

(22) Filed: Feb. 10, 2006

(65) Prior Publication Data

US 2007/0057923 A1    Mar. 15, 2007

(30) Foreign Application Priority Data

Sep. 15, 2005    (JP) ................................. 2005-268769

(51) Int. Cl.
*G06K 9/00* (2006.01)

(52) U.S. Cl. ......... 382/124; 345/173; 382/141; 382/161

(58) Field of Classification Search .................. 382/142, 382/185, 161; 345/173, 179, 182; 708/141; 715/203; 455/556.1
See application file for complete search history.

(56) References Cited

U.S. PATENT DOCUMENTS

| | | | | |
|---|---|---|---|---|
| 5,191,622 A * | 3/1993 | Shojima et al. | ............... | 382/185 |
| 5,267,327 A * | 11/1993 | Hirayama | ................. | 382/161 |
| 5,428,805 A * | 6/1995 | Morgan | ................. | 708/141 |
| 5,661,506 A * | 8/1997 | Lazzouni et al. | ............. | 345/179 |
| 5,838,819 A * | 11/1998 | Ruedisueli et al. | ........... | 382/187 |
| 6,100,877 A * | 8/2000 | Chery et al. | ................. | 345/178 |
| 6,339,431 B1 * | 1/2002 | Ohmori et al. | ................. | 345/619 |
| 6,565,611 B1 * | 5/2003 | Wilcox et al. | ................. | 715/203 |
| 6,885,878 B1 * | 4/2005 | Borgstrom et al. | ........ | 455/556.1 |
| 6,982,701 B2 * | 1/2006 | Lapstun et al. | ................. | 345/158 |
| 7,148,883 B2 * | 12/2006 | Komatsu | ................. | 345/182 |
| 2004/0032399 A1 * | 2/2004 | Sekiguchi et al. | ............ | 345/173 |
| 2005/0099399 A1 * | 5/2005 | Chang | ................. | 345/173 |
| 2008/0165156 A1 * | 7/2008 | Lapstun et al. | ................. | 345/173 |

FOREIGN PATENT DOCUMENTS

| | | | |
|---|---|---|---|
| EP | 0440812 | * | 8/1991 |
| JP | A-10/254615 | | 9/1998 |
| JP | 2000-247093 | | 9/2000 |
| JP | 2002-62980 | | 2/2002 |
| JP | 2005-173808 | | 6/2005 |

* cited by examiner

*Primary Examiner* — Wesley Tucker
*Assistant Examiner* — Aklilu k Woldemariam
(74) *Attorney, Agent, or Firm* — Morgan, Lewis & Bockius LLP (57) ABSTRACT

A system for recording handwritten notes includes a feature information obtaining section that obtains feature information of a user who is holding a handwriting tool, a handwritten notes obtaining section that obtains notes handwritten with the handwriting tool, and a recording section that records the feature information of the user who is holding the handwriting tool and the notes handwritten with the handwriting tool, the handwritten notes being directly or indirectly associated with the feature information.

13 Claims, 6 Drawing Sheets

| USER NAME | FEATURE INFORMATION |
|---|---|
| USER A | ------- |
| USER B | ------- |

FIG. 8

| USER NAME | LAYER | IMAGE DATA |
|---|---|---|
| USER A | BASIC LAYER | IMAGE DATA 1 |
| | STAR MARK LAYER | IMAGE DATA 2 |
| USER B | BASIC LAYER | IMAGE DATA 3 |
| | SQUARE MARK LAYER | IMAGE DATA 4 |
| | STAR MARK LAYER | IMAGE DATA 5 |

SYSTEM AND METHOD FOR RECORDING HANDWRITTEN NOTES

This application claims the benefit of Japanese Patent Application No. 2005-268769 filed in Japan on Sep. 15, 2005, which is hereby incorporated by reference.

BACKGROUND OF THE INVENTION

1. Field of the Invention

The present invention relates to a system and method for recording handwritten notes and, in particular, a system and method for recording notes handwritten by multiple users, while distinguishing each handwriter.

2. Description of the Related Art

A meeting is often held by using an electronic whiteboard allowing multiple participants in the meeting to write characters and/or figures to present their opinions so that the participants can share an idea. By such a manner of meeting, the meeting participants can form a common image and understanding of a subject of discussion in an efficient way. Notes handwritten onto the electronic chalkboard in this way may be recorded electronically or printed out on a recording medium such as paper, as appropriate.

However, after all the notes handwritten by the meeting participants are recorded electronically or printed out on a recording medium, it is quite difficult to distinguish what is handwritten by each participant from the recorded result.

SUMMARY OF THE INVENTION

The present invention has been made in view of the above problem and provides a system and method for recording handwritten notes, which can record notes handwritten by multiple users, distinguishing each handwriter, without requiring bothersome advance preparation and bothersome entry of ID or the like. Also, the invention provides a system and method for recording handwritten notes, which can group and record handwritten notes in an easy manner.

In order to address the above problem, a system for recording handwritten notes according to the present invention includes a feature information obtaining section that obtains feature information of a user who is holding a handwriting tool, a handwritten notes obtaining section that obtains notes handwritten with the handwriting tool, and a handwritten notes recording section that records the feature information of the user who is holding the handwriting tool and the notes handwritten by the user with the handwriting tool in a manner associating the feature information with the handwritten notes.

According to an aspect of the present invention, a system for recording handwritten notes includes a feature information obtaining section that obtains feature information of a user who is holding a handwriting tool, a handwritten notes obtaining section that obtains notes handwritten with the handwriting tool, and a recording section that records the feature information of the user who is holding the handwriting tool and the notes handwritten with the handwriting tool, the handwritten notes being directly or indirectly associated with the feature information.

BRIEF DESCRIPTION OF THE DRAWINGS

Embodiments of the present invention will be described in detail based on the following figures, wherein.

DETAILED DESCRIPTION OF THE INVENTION

Embodiments of the present invention will be described in detail hereinafter, based on the drawings.

Figure 1:
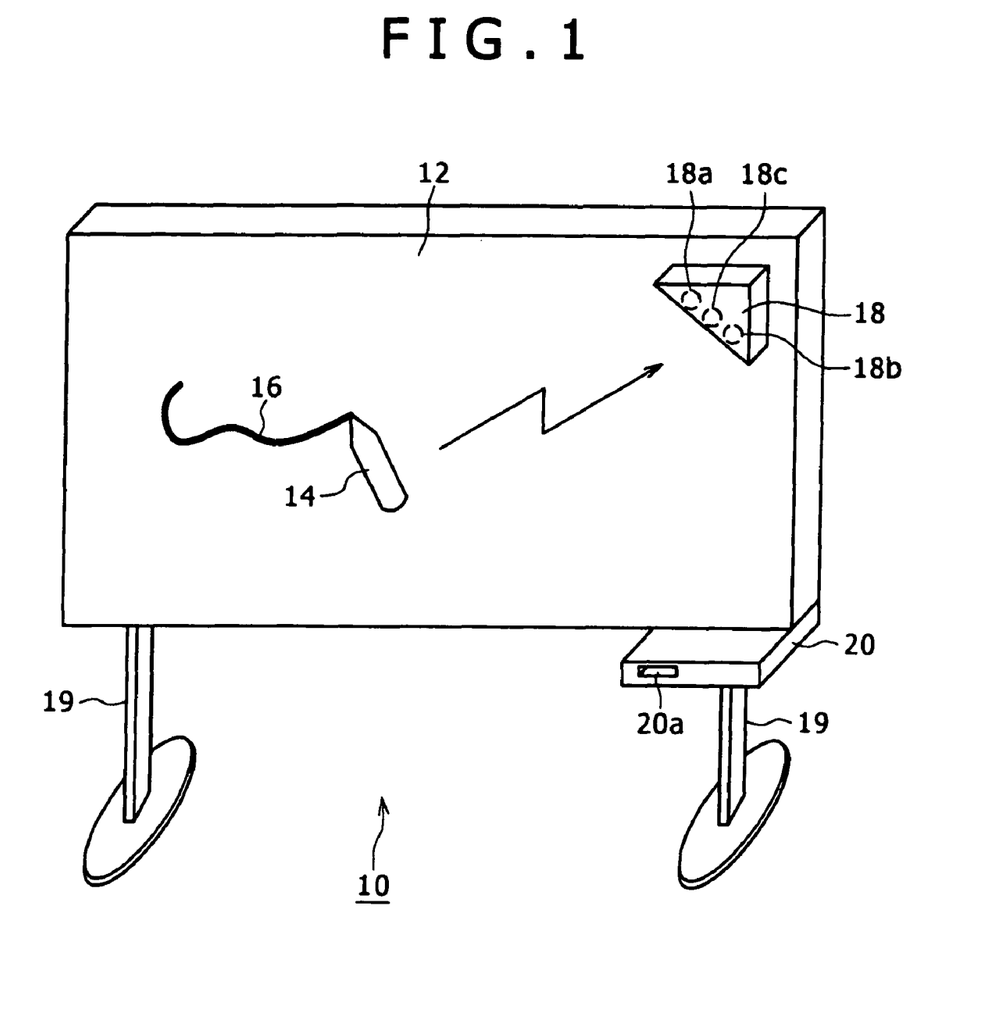
FIG. 1 is an overall appearance of a system for recording handwritten notes according to an exemplary embodiment of the present invention.

FIG. 1 is an overall appearance of a system for recording handwritten notes according to an exemplary embodiment of the present invention. As shown in FIG. 1, this system for recording handwritten notes 10 includes a flat whiteboard 12 with a certain thickness, which is supported to stand vertically or nearly vertically to the floor surface by a pair of legs 19, allowing a user to make arbitrary handwriting 16 with a handwriting pen 14 on this whiteboard 12. Specifically, the whiteboard 12 is made of a resinous material or the like that resists the penetration of ink and the user can make arbitrary handwriting 16 on the whiteboard 12 by ink fed from the tip of the handwriting pen 14. The handwriting pen 14 is adapted to emit ultrasonic waves and infrared signals, and a receiver module 18 to receive the ultrasonic waves and infrared signals is installed at the top right corner of the whiteboard 12. The receiver module 18 may be installed in any position on the periphery of the whiteboard 12.

The whiteboard 12 is equipped with a recording box 20 attached to its bottom and the receiver module 18 is connected to this recording box 20 having a medium insertion slot 20a in the front of the box. The receiver module 18 is arranged to receive ultrasonic waves and infrared signals from the handwriting pen 14 and transfer them to the recording box 20. The recording box 20 is arranged to generate and store image data corresponding to notes handwritten on the whiteboard 12 based on the ultrasonic waves and infrared signals. Handwritten notes thus stored can be written onto various types of storage media inserted into the medium insertion slot 20a. Here, the handwritten notes include anything that can be handwritten by a person.

Figure 2:
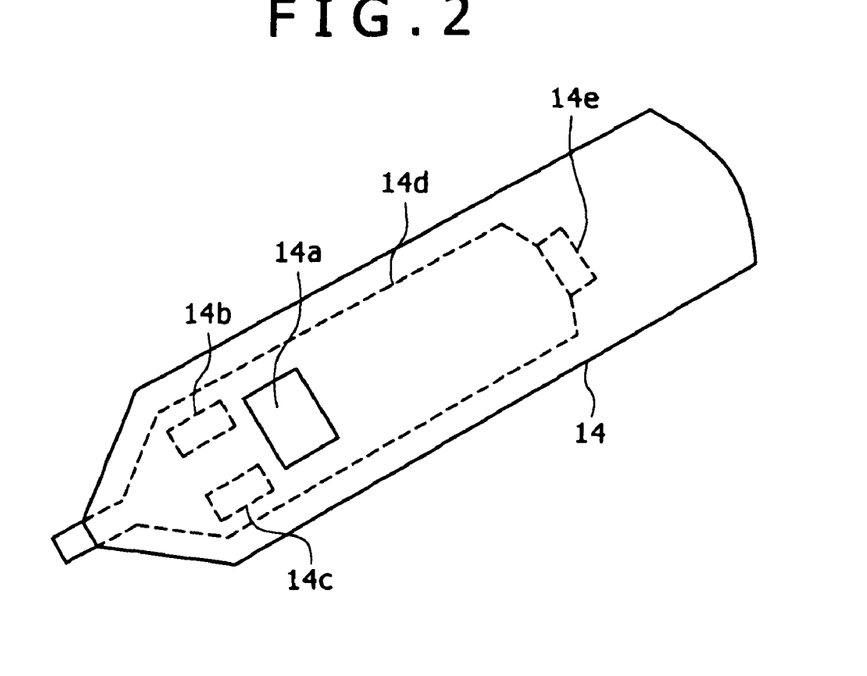
FIG. 2 illustrates a configuration of a handwriting pen.

FIG. 2 illustrates the configuration of the handwriting pen 14. As shown in FIG. 2, the handwriting pen 14 encases an ink pen 14d for writing on the whiteboard and the tip of the ink pen 14d is exposed from the tip of the handwriting pen 14. At the posterior end of the ink pen 14d, a pressure-sensitive sensor 14e is installed. When the tip of the ink pen 14d is pressed against the whiteboard 12 to make handwriting on the whiteboard 12, the pressure-sensitive sensor 14e senses the pressure, thus triggering the emission of infrared signals from an infrared emitting element 14b and ultrasonic waves from an ultrasonic oscillating element 14c. Herein, data representing the color of the ink pen 14d and data representing a handwriter's fingerprint which will be described later are transmitted via infrared signals.

Specifically, a touch-type fingerprint sensor 14a is installed on the handwriting pen 14 in a position corresponding to a touch position of the forefinger of a user's hand holding the handwriting pen 14. Infrared signals for data representing the user's fingerprint detected by this touch-type fingerprint sensor 14a are transmitted, along with data representing the color of the ink pen 14d, from the above infrared emitting element 14b via an infrared signal receiver 18c of the receiver module 18 to the recording box 20.

The receiver module 18 is also equipped with ultrasonic receivers 18a and 18b placed apart from each other. Ultrasonic waves emitted from the ultrasonic oscillating element 14c of the handwriting pen 14 are received by these ultrasonic receivers 18a and 18b. Based on the receiving timings of the ultrasonic receivers, the position of the tip of the handwriting pen 14 is calculated in the recording box 20, according to a so-called triangulation principle.

In this system for recording handwritten notes 10, the handwriting pen 14 is equipped with the touch-type fingerprint sensor 14a as described above and a handwriter can be identified. Thus, the recording box 20 can track how the position of the tip of the handwriting pen 14 has moved during a period of receiving data representing a handwriter's fingerprint via the infrared signals. Based on this tracking, the recording box 20 records notes handwritten by a handwriter with the handwriting pen 14, distinguishing each handwriter. Information identifying a handwriter, for example, his or her fingerprint information may be directly associated with the notes handwritten by the handwriter and recorded. Moreover, such information can be indirectly associated with the notes handwritten; that is, the fingerprint information is converted into an ID and the ID is associated with the notes handwritten by the handwriter. Furthermore, when a particular shape item such as a ster mark, square mark, etc. is drawn on the whiteboard 12, the notes handwritten with the item are recorded in a certain group.

Figure 3:
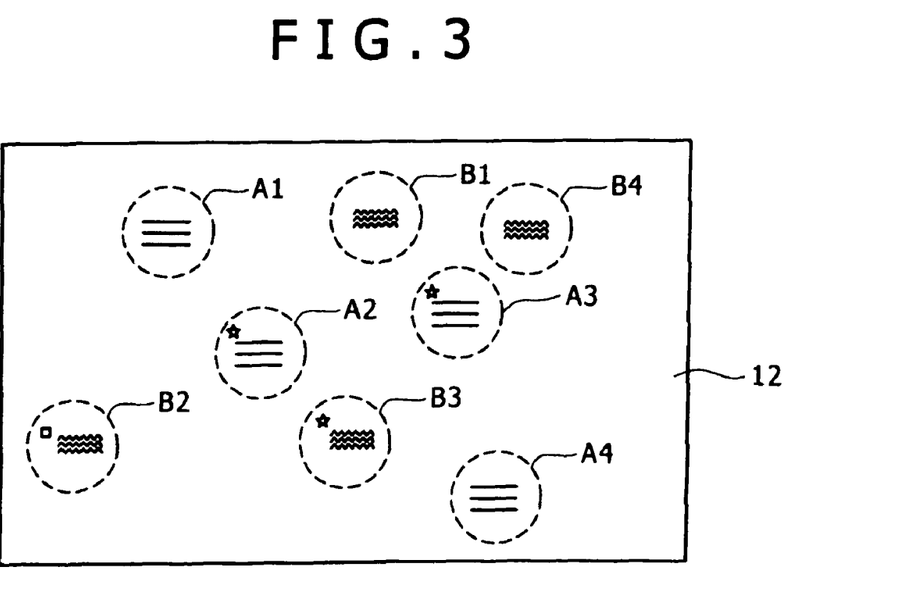
FIG. 3 illustrates simplified examples of notes handwritten on a whiteboard.

For example, as is shown in FIG. 3, when notes A1, A2, A3, A4 are handwritten by a user A and notes B1, B2, B3, B4 are handwritten by a user B on the whiteboard 12, the notes A1, A2, A3, A4 and the notes B1, B2, B3, B4 are first recorded in separate groups. The notes A2 and A3 handwritten by the user A include a star mark (particular shape item 1) and these notes A2 and A3 are recorded in a group different from other ones. Likewise, the notes B2 handwritten by the user B includes a square mark (particular shape item 2) and this note B2 is recorded in another group different from other ones. The note B3 handwritten by the user B includes a star mark and this note B3 is recorded in the other group different from other ones.

Figure 4A:
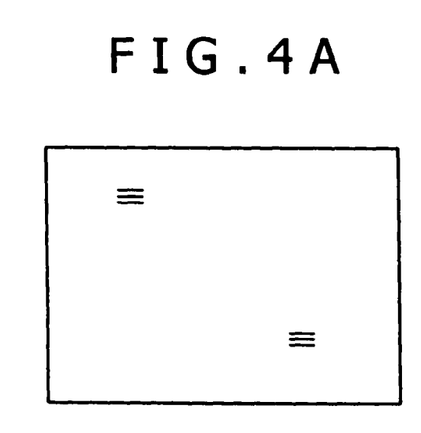
FIGS. 4A to 4E illustrate image data groups recorded.
Figure 4B:
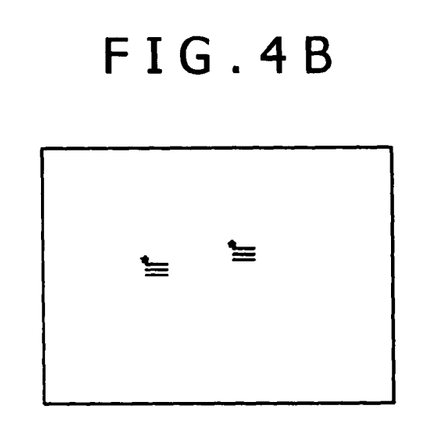
Figure 4C:
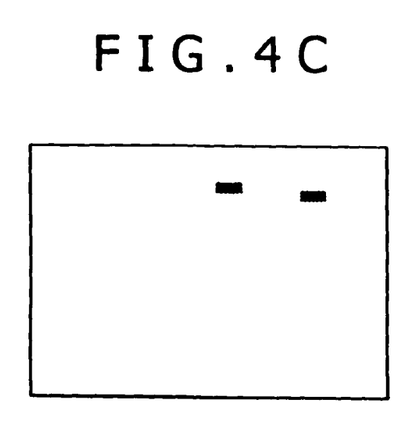
Figure 4D:
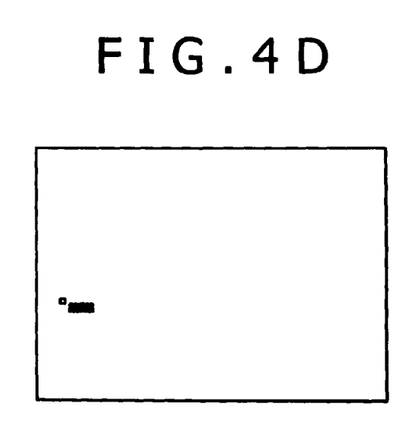
Figure 4E:
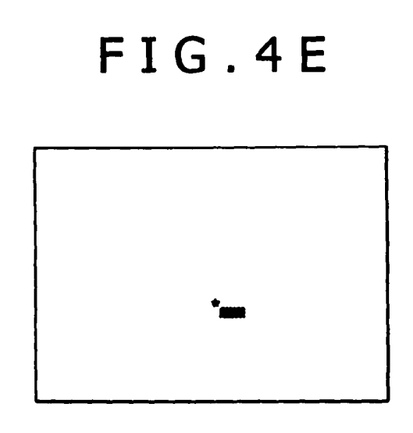
Figure 5:
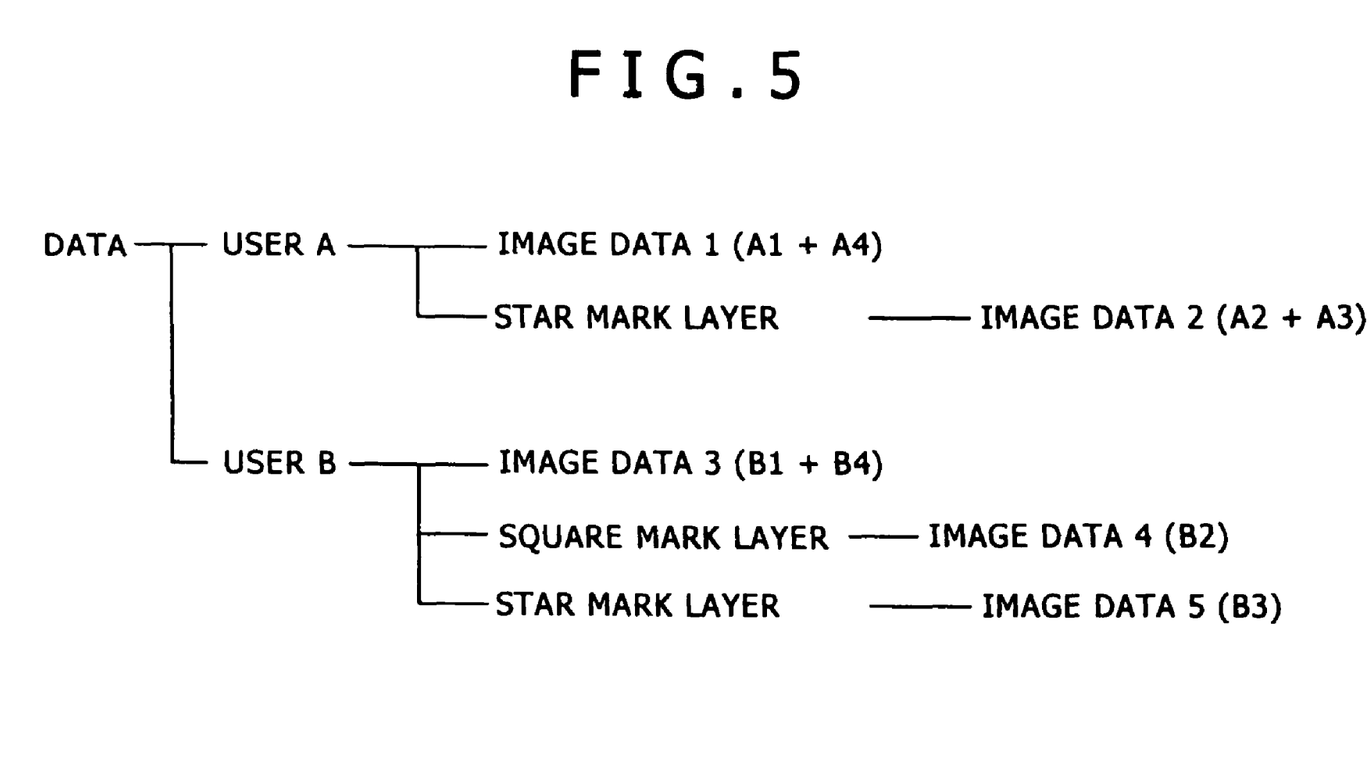
FIG. 5 illustrates a hierarchical structure (layered structure) of image data groups recorded.

When the notes are handwritten on the whiteboard 12 by two users with the handwriting pen 14 as above, image data 1 representing the notes handwritten by the user A not accompanied by a particular shape item is generated as is shown in FIG. 4A (corresponding to the notes A1 and A4 in FIG. 3), image data 2 representing the notes handwritten by the user A accompanied by a star mark is generated as is shown FIG. 4B (corresponding to the notes A2 and A3 in FIG. 3), image data 3 representing the notes handwritten by the user B not accompanied by any particular shape item is generated as is shown in FIG. 4C (corresponding to the notes B1 and B4 in FIG. 3), image data 4 representing the note handwritten by the user B accompanied by the square mark is generated as is shown in FIG. 4D (corresponding to the note B2 in FIG. 3), and image data 5 representing the note handwritten by user B accompanied by the star mark is generated as is shown in FIG. 4E (corresponding to the note B3 in FIG. 3). The image data 1 to 5 are recorded in different groups. In this system for recording handwritten notes 10, particularly, the image data 1 and 2 are recorded, associated with the user A's fingerprint feature information; eventually, associated with the user A. In particular, the image data 2 is recorded, associated with the star mark, one particular shape item. The image data 3 to 5 are recorded, associated with the user B's fingerprint feature information; eventually, associated with the user B. In particular, the image data 4 is recorded, associated with the square mark, one particular shape item, and the image data 5 is recorded, associated with the star mark, one particular shape item. All or a user-specified part of the thus recorded image data 1 to 5 will be displayed with one being superposed on another. In other words, these image data 1 to 5 are handled by an image processing software as layered image data. FIG. 5 illustrates a hierarchical structure of the image data 1 to 5. Both the image data 1 and the image data 2 belong to a layer of the user A; in particular, the image data 2 belongs to its sublayer of the star mark. All the image data 3 to 5 belong to a layer of the user B; in particular, the image data 4 belongs to its one sublayer of the square mark and the image data 5 belongs to another sublayer of the star mark.

Figure 6:
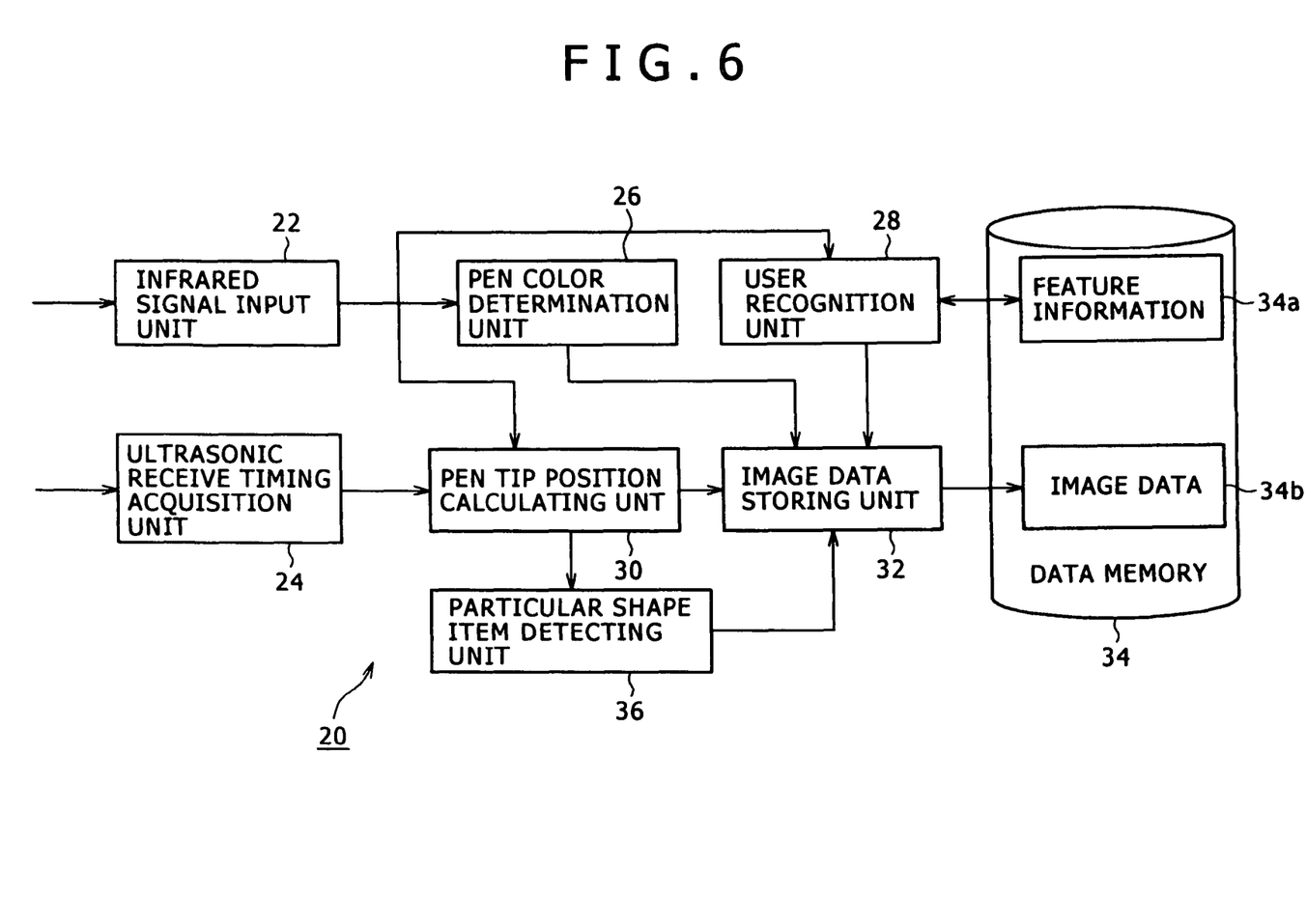
FIG. 6 is a functional block diagram of a recording box.

In the following, the recording box 20 that carries out a process of recording handwritten notes as above will be described in detail. FIG. 6 is a functional block diagram of the recording box 20. The recording box 20 is configured, including a well-known computer configuration mainly with a CPU and memories. By executing control software relevant to an exemplary embodiment of the present invention, the recording box 20 implements the functions of the following blocks as shown in FIG. 6: an infrared signal input unit 22, a pen color determination unit 26, a user recognition unit 28, an ultrasonic receive timing acquisition unit 24, a pen tip position calculating unit 30, an image data storing unit 32, a particular shape item detecting unit 36, and a data memory 34. The data memory 34 includes a feature information database 34a and an image database 34b.

Here, infrared signals emitted from the handwriting pen 14, received by the infrared receiver 18c of the receiver module 18, are input to the infrared signal input unit 22. The infrared signals include fingerprint data and color data representing the pen color. The fingerprint data is supplied to the user recognition unit 28 and the color data is supplied to the pen color determination unit 26. A timing at which receiving the infrared signals has started is supplied to the pen tip position calculating unit 30. From the handwriting pen 14, ultrasonic wave signals are also emitted concurrently with the emission of infrared signals. Timings at which the ultrasonic wave signals are received by the ultrasonic receivers 18a and 18b of the receiver module 18 are acquired by the ultrasonic receive timing acquisition unit 24. The pen tip position calculating unit 30 measures time from the timing at which receiving the infrared signals has started to the timing at which the ultrasonic waves are received by each ultrasonic receiver 18a and 18b and, from the time measurement, calculates a distance from each ultrasonic receiver 18a and 18b to the position of the tip of the handwriting pen 14. Based on this, the pen tip position calculating unit 30 calculates the coordinates of the position of the tip of the handwriting pen 14 on the whiteboard 12. This processing is performed at given time intervals and the coordinates of the tip position of the handwriting pen 14, determined at the given time intervals, are supplied with color data representing the pen color to the image data storing unit 32.

Figure 7:
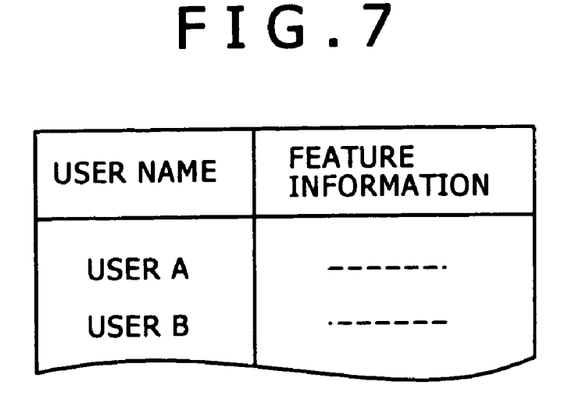
FIG. 7 illustrates a configuration of a feature information database.

The user recognition unit 28 generates a user's fingerprint feature information, for example, data representing fingerprint size, a unique pattern of fingerprint whorls, the center position of the whorls from the fingerprint data included in the infrared signals. The feature information database 34a, as is shown in FIG. 7, is to store feature information generated by the user recognition unit 28 and the name of a user having the fingerprint associated with the feature information (for example, a number or the like assigned to each user according to sequence in which feature information has been recognized by the user recognition unit 28). The user recognition unit 28 determines whether feature information identical or similar to generated feature information has already been stored in the feature information database 34*a*. If such information has already been stored, the user recognition unit 28 supplies the user name associated with that feature information and stored in the image data storing unit 32. If such information has not been stored yet, the user recognition unit 28 assigns a new user name (not associated with feature information) to generated feature information and stores the feature information associated with the new user name into the feature information database 34*a*. Then, the user recognition unit 28 supplies the new user name to the image data storing unit 32.

Figure 8:
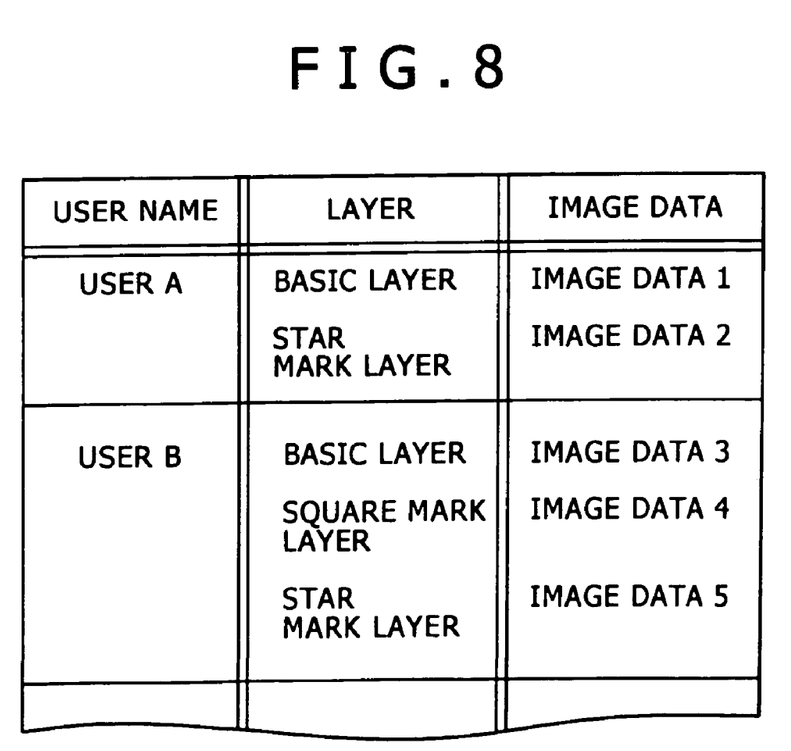
FIG. 8 illustrates a configuration of an image database.

The coordinates of the tip position of the handwriting pen 14, calculated at the given time intervals by the pen tip position calculating unit 30, are also supplied to the particular shape item detecting unit 36. The particular shape item detecting unit 36 monitors whether a particular shape item has been written from a track of the moving coordinates of the pen tip position captured at the given time intervals, that is, a note handwritten by the handwriting pen 14. Particular shape items are, for example, star, square, and other marks or symbols, which may not be normally used in general text or text regarding a field related to the subject of notes handwritten. Determining whether a particular shape item has been written can easily be made by, for example, a publicly-known pattern matching technique. If a particular shape item has been written, the particular shape item detecting unit 36 supplies data identifying the particular shape item to the image data storing unit 32. The image data storing unit 32 generates image data representing a note handwritten by a user with the handwriting pen 14 from time-sequential data of the moving coordinates of the pen tip position supplied from the pen tip position calculating unit 30. At this time, the color of the handwriting is determined by the color data supplied from the pen color determination unit 26. The image data storing unit 32 stores this image data in association with the user name supplied from the user recognition unit 28 and the data identifying a particular shape item supplied from the particular shape item detecting unit 36 into the image database 34*b*. The image database 34*b*, as is shown in FIG. 8, is to store layers and image data associated with each user name. In this database, data supplied from the user recognition unit 28 is stored as a user name, data supplied from the particular shape item detecting unit 36 is stored as a layer, and image data generated as above is stored as image data.

As described above, according to the exemplary embodiment, the recording box 20 obtains the feature information of a user who is holding the handwriting pen 14 and image data representing notes handwritten with the handwriting pen 14. The image data representing the notes handwritten with the handwriting pen 14 is recorded, associated with the feature information of the user who is holding the handwriting pen 14. It becomes possible to record notes handwritten by multiple users, distinguishing each handwriter, without requiring bothersome advance preparation and bothersome entry of ID or the like. Simply by writing a particular shape item such as a star mark, square mark, etc., a user can generate a sublayer exclusively for the user and record the notes handwritten onto that sublayer.

The present invention is not limited to the foregoing exemplary embodiment. For example, while fingerprint data is used as a user's feature information in the foregoing description, handwriting sample data representing the handwriting of a user may be used instead. In this case, handwriting sample data may be obtained, based on handwriting made by each user on the whiteboard 12 or each user may be prompted to make handwriting with the handwriting pen 14 in a certain area from where handwriting sample data may be obtained.

As described above, according to an aspect of the present invention, a system for recording handwritten notes includes a feature information obtaining section that obtains feature information of a user who is holding a handwriting tool, a handwritten notes obtaining section that obtains notes handwritten with the handwriting tool, and a recording section that records the feature information of the user who is holding the handwriting tool and the notes handwritten with the handwriting tool, the handwritten notes being directly or indirectly associated with the feature information.

The feature information obtaining section may be provided in the handwriting tool, include a fingerprint sensor that detects a fingerprint of a user who is holding the handwriting tool, and obtain information representing the user's fingerprint detected by the fingerprint sensor as the feature information of the user who is holding the handwriting tool.

The feature information obtaining section may obtain information representing handwriting sample of a user who is holding the handwriting tool as the feature information of the user who is holding the handwriting tool.

If feature information obtained by the feature information obtaining section matches a feature of a user for which feature information and notes handwritten have already been recorded by the recording section, the recording section may further record handwritten notes newly obtained by the handwritten notes obtaining section, the newly obtained handwritten notes being directly or indirectly associated with the already recorded feature information.

Under a predefined condition, the recording section may record notes handwritten with the handwriting tool obtained by the handwritten notes obtaining section, the handwritten notes being directly or indirectly associated with feature information of a particular user already recorded by the recording section, independent of the feature information of a user who is holding the handwriting tool.

The predefined condition may be a predefined action being performed by a user.

The predefined action may be writing a particular shape item.

The above system may further include a determination section that determines whether a particular shape item has been written with the handwriting tool. If the determination section determines that a particular shape item has been written, the recording section may record notes handwritten including the particular shape item in a group of handwritten notes including the same particular shape item.

According to another aspect of the present invention, a system for recording handwritten notes includes a handwritten notes obtaining section that obtains notes handwritten by a user, a determination section that determines whether a particular shape item has been written by the user, and a handwritten notes recording section that, if the determination section determines that a particular shape item has been written, records notes handwritten including the particular shape item in a group of handwritten notes including the same particular shape item.

According to still another aspect of the present invention, a method for recording handwritten notes includes obtaining feature information of a user who is holding a handwriting tool, obtaining notes handwritten with the handwriting tool, and recording the feature information of the user who is holding the handwriting tool and the notes handwritten with the handwriting tool, the handwritten notes being directly or indirectly associated with the feature information.

According to another aspect of the present invention, a method for recording handwritten notes includes obtaining notes handwritten by a user, determining whether a particular shape item has been written by the user, and if it is determined that a particular shape item has been written, recording notes handwritten including the particular shape item in a group of handwritten notes including the same particular shape item.

According to still another aspect of the present invention, a storage medium, readable by a computer, stores a program of instructions executable by the computer to perform a function for recording handwritten notes. The function includes obtaining feature information of a user who is holding a handwriting tool, obtaining notes handwritten with the handwriting tool, and recording the feature information of the user who is holding the handwriting tool and the notes handwritten with the handwriting tool, the handwritten notes being directly or indirectly associated with the feature information.

According to still another aspect of the present invention, a storage medium, readable by a computer, stores a program of instructions executable by the computer to perform a function for recording handwritten notes. The function includes obtaining notes handwritten by a user, determining whether a particular shape item has been written by the user, and if it is determined that a particular shape item has been written, recording notes handwritten including the particular shape item in a group of handwritten notes including the same particular shape item.

The present invention may be embodied in other specific forms without departing from its spirit or characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A system for recording handwritten notes, comprising:
   a handwriting tool having,
   an ultrasonic oscillating element, and
   a feature information obtaining section to obtain feature information of a user of the handwriting tool to identify the user;
   a handwritten notes obtaining apparatus that has at least two ultrasonic receivers and that obtains notes handwritten with the handwriting tool; and
   a recording apparatus that records the feature information of the user from the handwriting tool and the notes handwritten with the handwriting tool, and associates the notes handwritten with the handwriting tool with the feature information.

2. The system for recording handwritten notes according to claim 1, wherein the feature information obtaining section includes a fingerprint sensor that detects a fingerprint of a user who is holding the handwriting tool, and obtains information representing the user's fingerprint detected by the fingerprint sensor as the feature information of the user who is holding the handwriting tool.

3. The system for recording handwritten notes according to claim 1, wherein the feature information obtaining section obtains information representing handwriting sample of a user who is holding the handwriting tool as the feature information of the user who is holding the handwriting tool.

4. The system for recording handwritten notes according to claim 1, wherein if feature information obtained by the feature information obtaining section matches a feature of a user for which feature information and notes handwritten have already been recorded by the recording apparatus, the recording apparatus further records handwritten notes newly obtained by the handwritten notes obtaining apparatus, the newly obtained handwritten notes being associated with the already recorded feature information.

5. The system for recording handwritten notes according to claim 1, wherein under a predefined condition, the recording apparatus records notes handwritten with the handwriting tool obtained by the handwritten notes obtaining apparatus, the handwritten notes being associated with feature information of a particular user already recorded by the recording apparatus, independent of the feature information of a user who is holding the handwriting tool.

6. The system for recording handwritten notes according to claim 5, where in the predefined condition is a predefined action being performed by a user.

7. The system for recording handwritten notes according to claim 6, wherein the predefined action is writing a particular shape item.

8. The system for recording handwritten notes according to claim 1, further comprising a determination apparatus that determines whether a particular shape item has been written with the handwriting tool, wherein, if the determination apparatus determines that a particular shape item has been written, the recording apparatus records notes handwritten including the particular shape item in a group of handwritten notes including the same particular shape item.

9. A system for recording handwritten notes, comprising:
   a handwritten notes obtaining apparatus to obtain notes handwritten by a user;
   a feature information obtaining apparatus to obtain feature information of the user to identify the user;
   a determination apparatus to determine whether a particular shape item has been written by the user; and
   a handwritten notes recording apparatus that associates the notes handwritten by the user with the feature information of the user and, if the determination apparatus determines that a particular shape item has been written, the handwritten notes recording apparatus records the notes handwritten by the user, including the particular shape item, in a group of handwritten notes including the same particular shape item.

10. A method for recording handwritten notes, comprising:
    obtaining feature information of a user from a handwriting tool to identify the user;
    obtaining notes handwritten with the handwriting tool by receiving ultrasonic waves from an ultrasonic oscillating element;
    recording the feature information of the user of the handwriting tool and the notes handwritten with the handwriting tool in a computer readable medium; and
    associating the handwritten notes with the feature information.

11. A method for recording handwritten notes, comprising:
    obtaining feature information of a user from a handwriting tool to identify the user;
    obtaining notes handwritten by a user by receiving ultrasonic waves from an ultrasonic oscillating element;
    associating the handwritten notes with the feature information;
    determining whether a particular shape item has been written by the user; and
    if it is determined that a particular shape item has been written, recording notes handwritten including the particular shape item in a group of handwritten notes including the same particular shape item in a computer readable medium.

12. A non-transitory computer readable storage medium, the storage medium storing a program of instructions executable by the computer to perform a function for recording handwritten notes, the function comprising:
   obtaining feature information of a user from a handwriting tool to identify the user;
   obtaining notes handwritten with the handwriting tool by receiving ultrasonic waves from an ultrasonic oscillating element;
   recording the feature information of the user who is holding the handwriting tool and the notes handwritten with the handwriting tool; and
   associating the handwritten notes with the feature information.

13. A non-transitory computer readable storage medium, the storage medium storing a program of instructions executable by the computer to perform a function for recording handwritten notes, the function comprising:
   obtaining feature information of a user from a handwriting tool to identify the user;
   obtaining notes handwritten by a user by receiving ultrasonic waves from an ultrasonic oscillating element;
   associating the handwritten notes being directly or indirectly associated with the feature information;
   determining whether a particular shape item has been written by the user; and
   if it is determined that a particular shape item has been written, recording notes handwritten including the particular shape item in a group of handwritten notes including the same particular shape item.

* * * * *